(12) United States Patent
Dindar et al.

(10) Patent No.: US 10,837,362 B2
(45) Date of Patent: Nov. 17, 2020

(54) INLET COWL FOR A TURBINE ENGINE

(71) Applicant: General Electric Company, Schenectady, NY (US)

(72) Inventors: Mustafa Dindar, Cincinnati, OH (US); Joseph Donofrio, Moncalieri (IT); Richard David Cedar, Montgomery, OH (US); David William Crall, Loveland, OH (US)

(73) Assignee: General Electric Company, Schenectady, NY (US)

( * ) Notice: Subject to any disclaimer, the term of this patent is extended or adjusted under 35 U.S.C. 154(b) by 385 days.

(21) Appl. No.: 15/291,110

(22) Filed: Oct. 12, 2016

(65) Prior Publication Data
US 2018/0100434 A1    Apr. 12, 2018

(51) Int. Cl.
*B64D 33/02* (2006.01)
*F02C 7/057* (2006.01)
*F02C 7/042* (2006.01)

(52) U.S. Cl.
CPC ............. *F02C 7/057* (2013.01); *B64D 33/02* (2013.01); *F02C 7/042* (2013.01); *B64D 2033/0226* (2013.01); *F05D 2240/127* (2013.01); *F05D 2260/57* (2013.01); *Y02T 50/60* (2013.01)

(58) Field of Classification Search
CPC .. F02C 7/04; F02C 7/042; F02C 7/045; F02C 7/057; F01D 25/24; F05D 2240/14; F05D 2260/57; F05D 2270/17; B64C 7/02; B64D 2033/0226
See application file for complete search history.

(56) References Cited

U.S. PATENT DOCUMENTS

| | | | |
|---|---|---|---|
| 3,575,259 A * | 4/1971 | Wilkinson | F02C 7/045 137/15.1 |
| 3,611,724 A | 10/1971 | Kutney | |
| 3,664,612 A | 5/1972 | Skidmore et al. | |
| 3,770,228 A | 11/1973 | Traksel et al. | |
| 5,779,189 A | 7/1998 | Hamstra et al. | |
| 5,961,080 A | 10/1999 | Sinha | |
| 6,334,753 B1 * | 1/2002 | Tillman | B64C 21/04 415/1 |
| 6,892,526 B2 * | 5/2005 | Stretton | B64D 29/00 244/53 B |
| 7,637,455 B2 | 12/2009 | Silkey et al. | |
| 8,038,102 B2 | 10/2011 | Miller et al. | |

(Continued)

FOREIGN PATENT DOCUMENTS

| | | |
|---|---|---|
| CN | 101898634 A | 12/2010 |
| CN | 102171101 A | 8/2011 |

(Continued)

OTHER PUBLICATIONS

Chinese Office Action issued in related Chinese patent application No. 201710947775.3, dated Jul. 26, 2019.

*Primary Examiner* — Jason H Duger
(74) *Attorney, Agent, or Firm* — McGarry Bair PC

(57) ABSTRACT

The disclosure is towards an inlet cowl for a turbine engine including a surface defining an inlet with a flow path and a method towards controlling the airflow in the flow path. The inlet cowl further includes an inlet lip and inner and outer barrels. The inlet lip confronts the inner barrel at a junction defining a gap.

27 Claims, 9 Drawing Sheets

(56) References Cited

U.S. PATENT DOCUMENTS

| | | | |
|---|---|---|---|
| 8,186,942 B2 * | 5/2012 | Haas | B64D 33/02 244/53 B |
| 8,302,904 B2 | 11/2012 | McKeon et al. | |
| 8,402,738 B2 | 3/2013 | Truax et al. | |
| 8,408,491 B2 * | 4/2013 | Jain | B64C 23/00 244/53 B |
| 8,544,799 B2 | 10/2013 | Da Silva et al. | |
| 8,641,367 B2 | 2/2014 | Norris et al. | |
| 8,657,567 B2 | 2/2014 | Cloft et al. | |
| 8,839,805 B2 | 9/2014 | Zysman et al. | |
| 8,967,964 B2 | 3/2015 | Sheaf et al. | |
| 9,109,466 B2 | 8/2015 | Lo et al. | |
| 9,228,534 B2 | 1/2016 | Jain et al. | |
| 2005/0274103 A1 * | 12/2005 | Prasad | B64D 33/02 60/226.1 |
| 2009/0155072 A1 | 6/2009 | Winter | |
| 2009/0261206 A1 | 10/2009 | Alvi | |
| 2010/0140416 A1 | 6/2010 | Ohanian, III et al. | |
| 2010/0215479 A1 | 8/2010 | Prasad et al. | |
| 2015/0360790 A1 | 12/2015 | Rouyre | |

FOREIGN PATENT DOCUMENTS

| | | |
|---|---|---|
| CN | 102307784 A | 1/2012 |
| CN | 102333697 A | 1/2012 |
| CN | 103328800 A | 9/2013 |
| EP | 2003310 A2 | 12/2008 |
| EP | 2607657 A2 | 6/2013 |
| WO | 0236951 A1 | 5/2002 |

* cited by examiner

INLET COWL FOR A TURBINE ENGINE

BACKGROUND OF THE INVENTION

Contemporary aircraft turbine engines used in commercial aircraft are conventionally of a fan jet construction, e.g., the engines have a high volume fan at an axially forward end for forcing air into a first flow passage through an axial compressor, combustor and turbine and into a second bypass flow passage for providing thrust. The fan is positioned within a nacelle surrounding and spaced from a core engine housing containing the compressor, combustor and turbine, the space between the nacelle structure and core engine housing defining the bypass flow passage. During static operation of the engine, a crosswind can generate a distorted inlet airflow resulting in undesirable conditions near the fan blades. If not corrected this distorted inlet airflow can affect the efficiency of the compressor and fan blade aeromechanics.

BRIEF DESCRIPTION OF THE INVENTION

In one aspect, an inlet cowl for a turbine engine comprising an annular body with a surface defining an inlet opening and an outlet opening to define a flow direction from the inlet opening to the outlet opening, with the surface having a cross-sectional profile with a protuberance in the surface of the inlet opening.

A turbine engine comprising an inlet and an exhaust, with a compressor section, a combustion section, and turbine section in axial arrangement to define a flow path between the inlet and the exhaust, an annular inlet cowl having an inlet lip with a surface, an inner barrel, and an outer barrel, the surface confronting the inner barrel at a junction, and a protuberance at the junction.

A method of controlling airflow distortion in an inlet cowl of a turbine engine comprising an annular body with a surface defining an inlet opening and an outlet opening to define a flow direction from the inlet opening to the outlet opening, the method comprising reducing airflow separation along an interior surface of the inlet by flowing air over a protuberance on the surface of the inlet cowl.

DESCRIPTION OF EMBODIMENTS OF THE INVENTION

Figure 1:
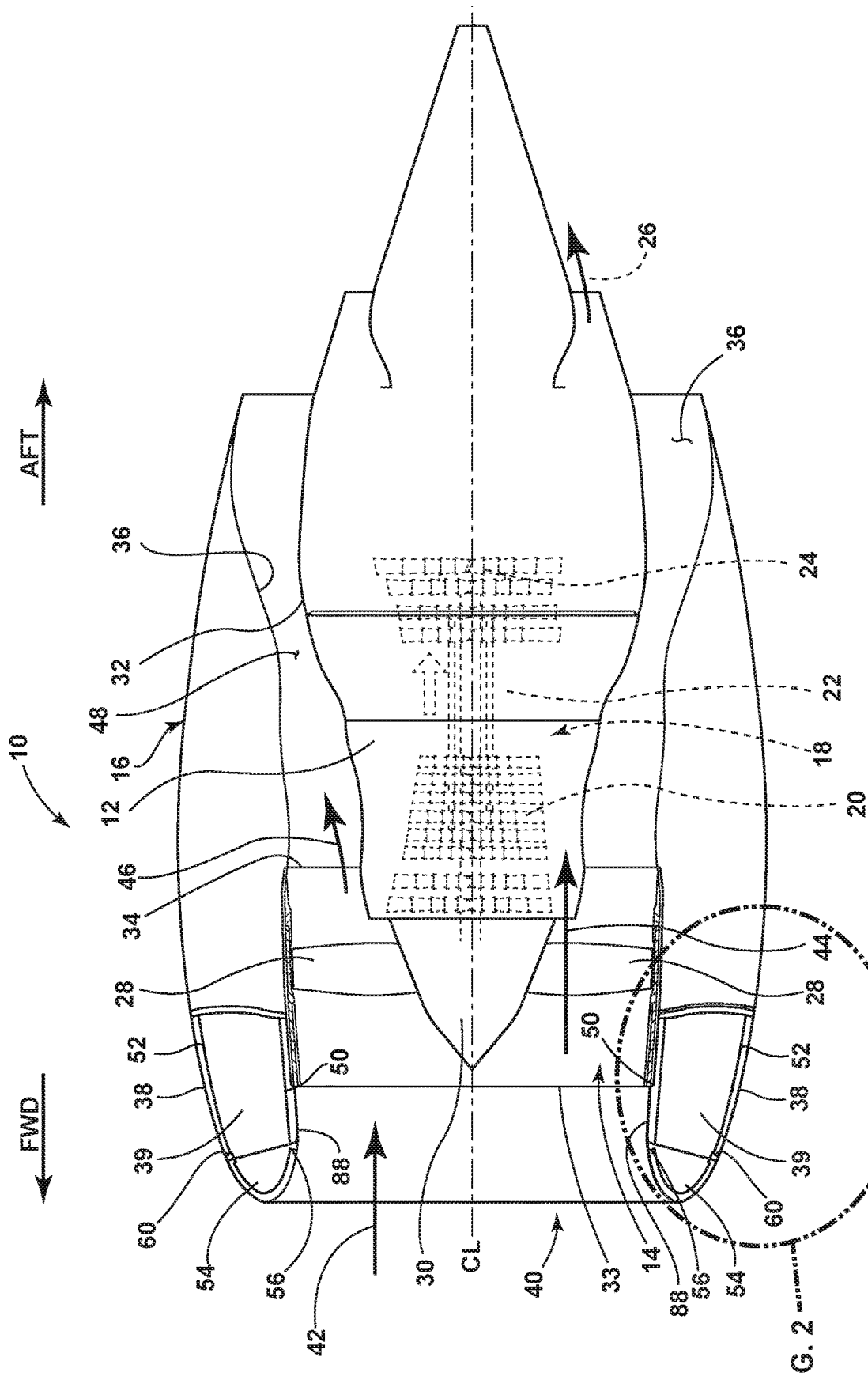
FIG. 1 is a schematic view of an aircraft engine assembly illustrating an engine core surrounded by a nacelle, with a portion of an annular inlet cowl of the outer nacelle cut away for clarity.

Embodiments of the present disclosure described herein are directed to a protuberance provided on a surface of an annular inlet cowl at a junction between an inlet lip and an inner barrel. For purposes of illustration, the present invention will be described with respect to a generic turbofan jet engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates an aircraft engine assembly 10 having a centerline CL and including a turbine engine 12, a fan assembly 14, and a nacelle 16. The turbine engine 12 includes an engine core 18 having a compressor 20, a combustor 22, a turbine 24, and an exhaust 26 section. An inner cowl 32 radially surrounds the engine core 18.

The compressor 20, combustor 22, and turbine 24 drive the fan assembly 14 including fan blades 28, and a spinner 30. While only two blades 28 are shown, it should be appreciated that a plurality of blades 28 typically circumscribe the spinner 30. The fan assembly 14 can further include an annular forward casing 33 and an aft casing 34 forming a portion of an outer cowl 36 formed by the nacelle 16.

The nacelle 16 further includes an annular inlet cowl 38 with a body 39 having a surface 88 defining an inlet opening 40 and an outlet opening 41. An inlet airflow 42 runs from the inlet opening 40 to the outlet opening 41. A portion 44 of the inlet airflow 42 passes into the engine 10 where it is compressed, mixed with fuel and ignited in the combustor 22. A larger portion 46 of the inlet airflow 42 bypasses the engine core 18 through a bypass duct 48.

The annular inlet cowl 38 includes radially spaced inner and outer barrels 50, 52 that abut an annular nose lip section 54 provided axially upstream of the barrels 50, 52. The annular nose lip section 54 terminates in an inlet lip 56 and an outer lip 58. The outer lip 58 can be connected to the outer barrel 52 by circumferentially spaced fasteners 60, such as rivets or the like. By way of a non-limiting example, the inlet lip 56 and the inner barrel 50 define the surface 88. It can be further contemplated that the surface 88 can be defined by any portion of the annular inlet cowl 38 including the outer barrel 52 and outer lip 58.

Figure 2:
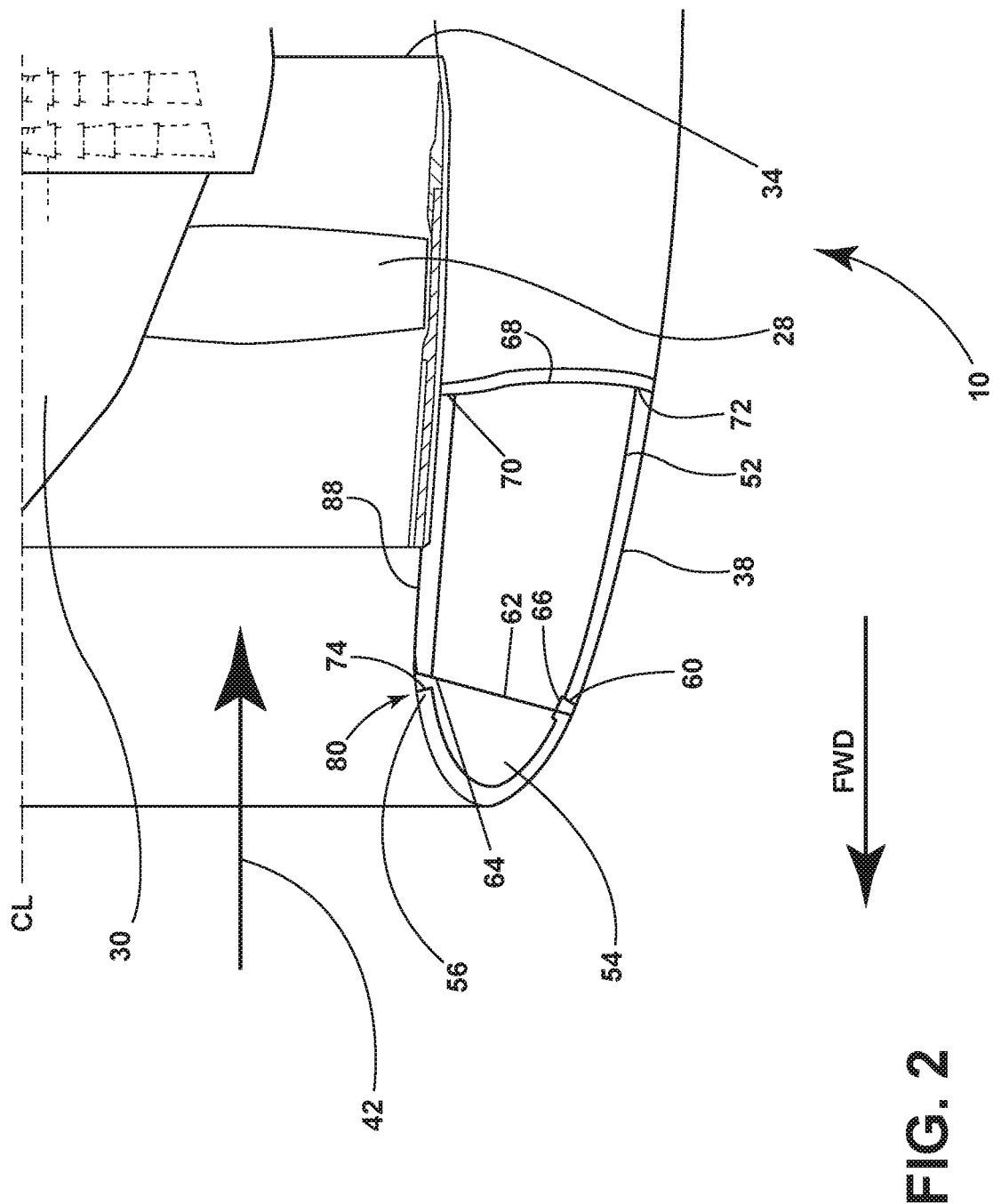
FIG. 2 is an enlarged view of a portion of the annular inlet cowl showing an inlet lip and inner/outer barrels from FIG. 1.

Turning to FIG. 2, an enlarged view of the nose lip section 54 illustrates a junction 80 between the inlet lip 56 and the inner barrel 50. A forward bulkhead 62 extends between radially spaced apart upstream edges 64, 66 of the inner and outer barrels 50, 52. An aft bulkhead 68 connects radially spaced apart inner and outer barrel aft ends 70, 72 of the inner and outer barrels 50, 52. The forward and aft bulkheads 62, 68 contribute to the rigidity and strength of the annular inlet cowl 38. The inlet lip 56 terminates in a downstream edge 74 where it confronts the upstream edge 64 of the inner barrel 50.

Figure 3:
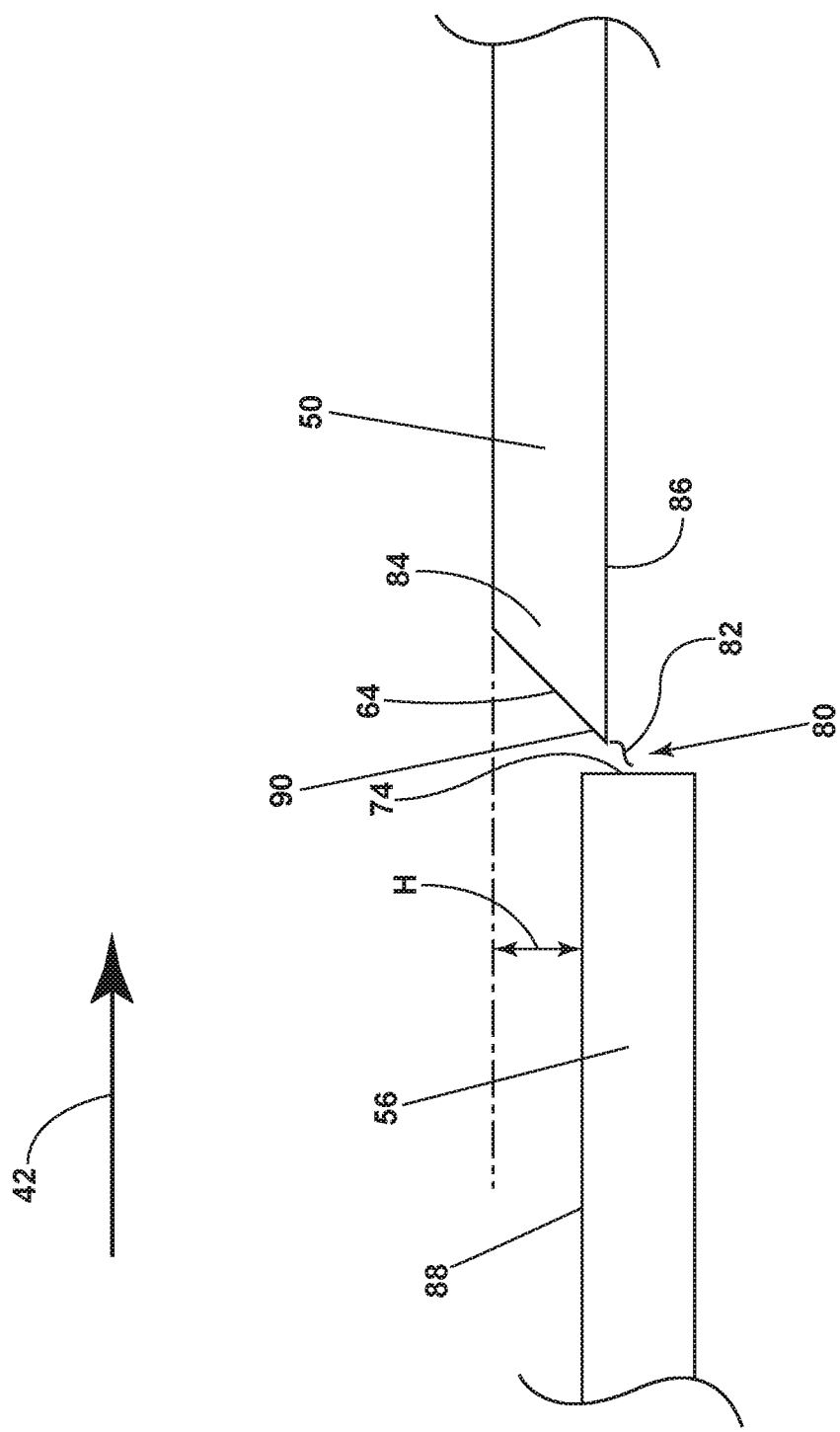
FIG. 3 is a schematic cross-section of a junction of an inlet lip and inner barrel of FIG. 2.

FIG. 3 depicts an enlarged view of a cross-section of a first embodiment of the junction 80 defining an intervening gap 82 between the downstream edge 74 of the inlet lip 56 and the upstream edge 64 of the inner barrel 50. A protuberance 84 extends radially inward from an outer surface 86 of the barrel 50 with a maximum height H. The maximum height H can vary on several factors, including the size of the inlet and the expected operating conditions. For a subsonic inlet flow of a turbine engine for contemporary commercial aircraft, a maximum height H is one to two times the displacement thickness $\delta^*$ calculated:

$$\delta^* = \int_0^\delta (1 - u/U) dy$$

where u is the velocity at a distance y from the surface 88, U is the velocity of airflow 42, and $\delta$ is a boundary layer thickness: a distance measured from the surface to a point where u/U=0.99. The boundary layer $\delta$ and displacement thickness $\delta^*$ on the inlet surface 88 can be measured using pressure sensing elements embedded into the flow near the surface 88 across an applicable range of corrected fan speeds, N1K. Alternatively, accurate numerical calculations can be done to achieve the same. Once the displacement thickness $\delta^*$ is established for the part-speed fan region where flow separation occurs, then maximum height H of the protuberance is established and used during the operation of the inlet, without having to measure it again.

The maximum height H is measured perpendicularly from the surface 88 at the inlet lip 56. The protuberance 84 is chamfered terminating in a tip 90 at the upstream edge 64 of the barrel 50. The tip 90 can be flush with the surface 88 at the inlet lip 56, or radially outward of or below the downstream edge 74 as illustrated.

Figure 4:
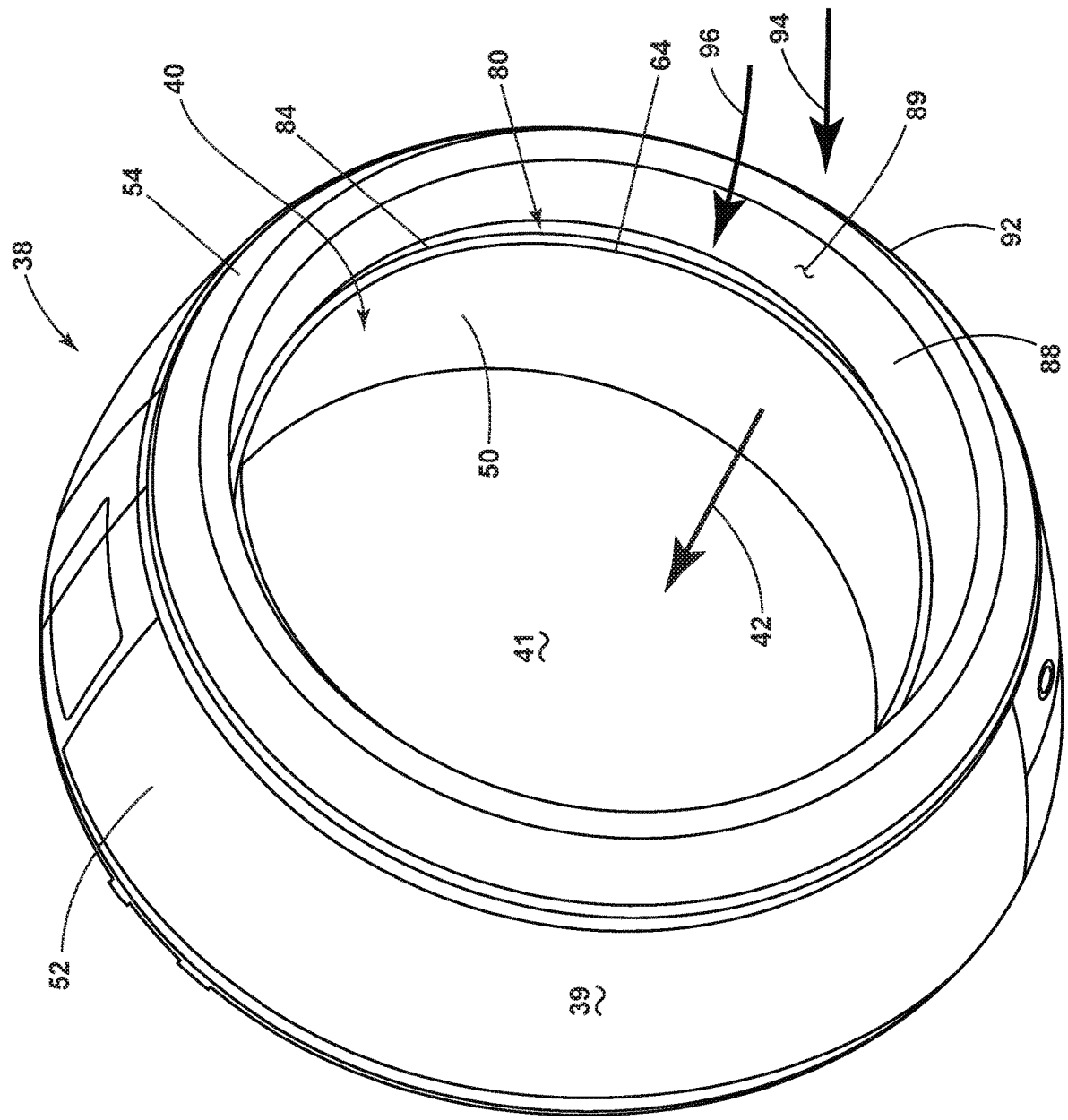
FIG. 4 is a perspective view of the annular inlet cowl.

Turning to FIG. 4, a perspective view of the annular inlet cowl 38 shows the protuberance 84 within the annular inlet cowl 38 spanning at least 180 degrees of the inner barrel 50. The at least 180 degrees of the protuberance 84 is provided along a portion 92 of the annular inlet cowl 38 confronting a crosswind 94. While illustrated as 180 degrees, it is contemplated that the protuberance 84 can be more or less than 180 degrees, including a full 360 degrees within the entirety of the inner barrel 50.

Under normal operating conditions, air enters the annular inlet cowl 38 as a normal inlet airflow 42. The presence of a crosswind 94 can generate a distorted inlet airflow 96 in which the normal inlet airflow 42 separates, decreasing the pressure in the annular inlet cowl 38 resulting in a distorted inlet airflow 96 reaching the fan blades 28. This distorted inlet airflow 96 increases the inefficiency of the compressor, including the possibility of a compressor stall. Introducing the protuberance 84 to the annular inlet cowl 38 decreases the amount of separation in the airflow 42 enabling the engine to operate within an operational envelope dictated by the maximum level of crosswind the aircraft can handle. By minimizing or preventing an airflow separation, the operational envelope can be expanded. For example, in an aircraft that can sustain a maximum level of crosswind of 25 knots, introducing the protuberance 84 could increase the envelope to include crosswinds of up to 30 knots.

Figure 5:
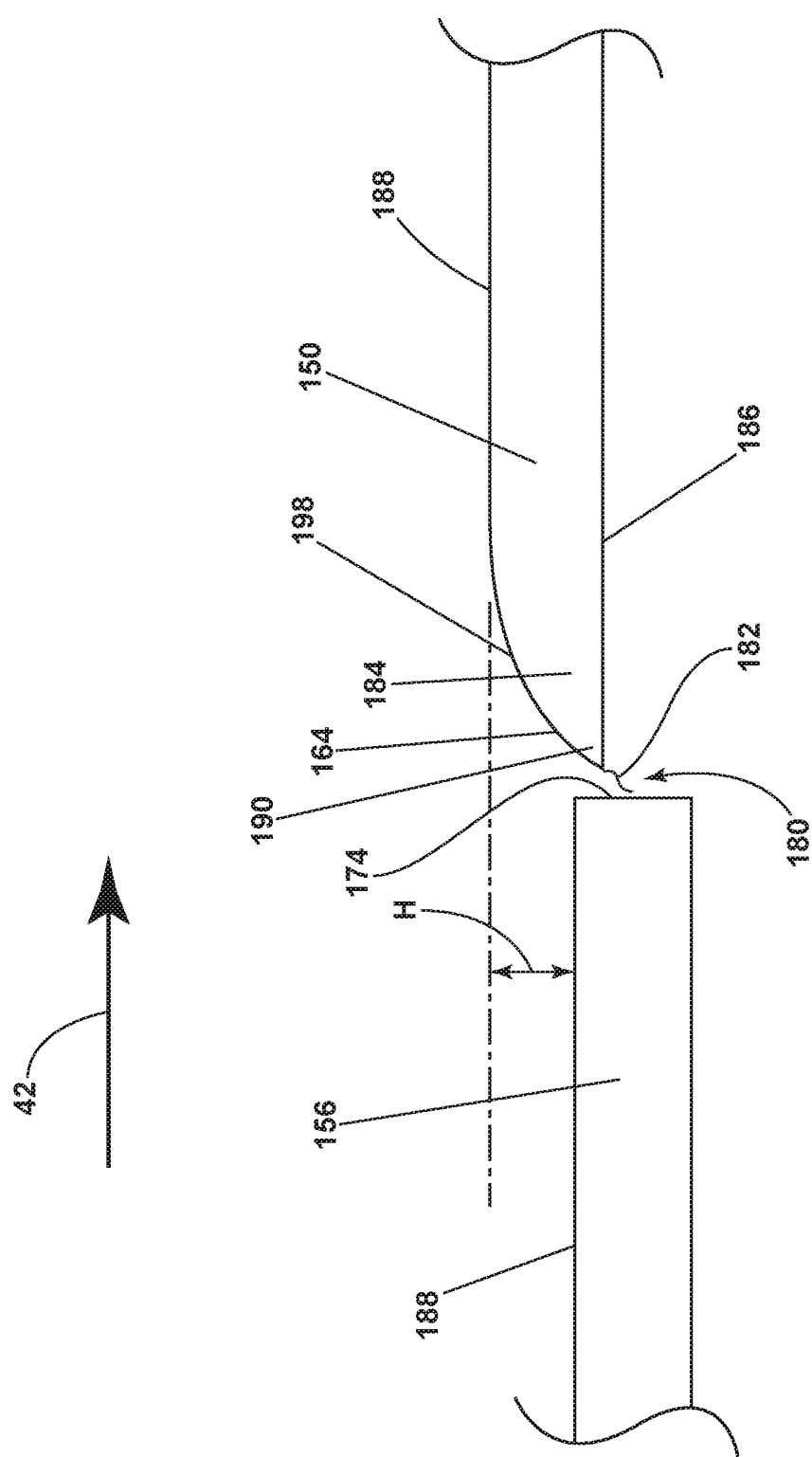
FIG. 5 is a second embodiment of a junction of the annular inlet cowl of FIG. 2.
Figure 6:
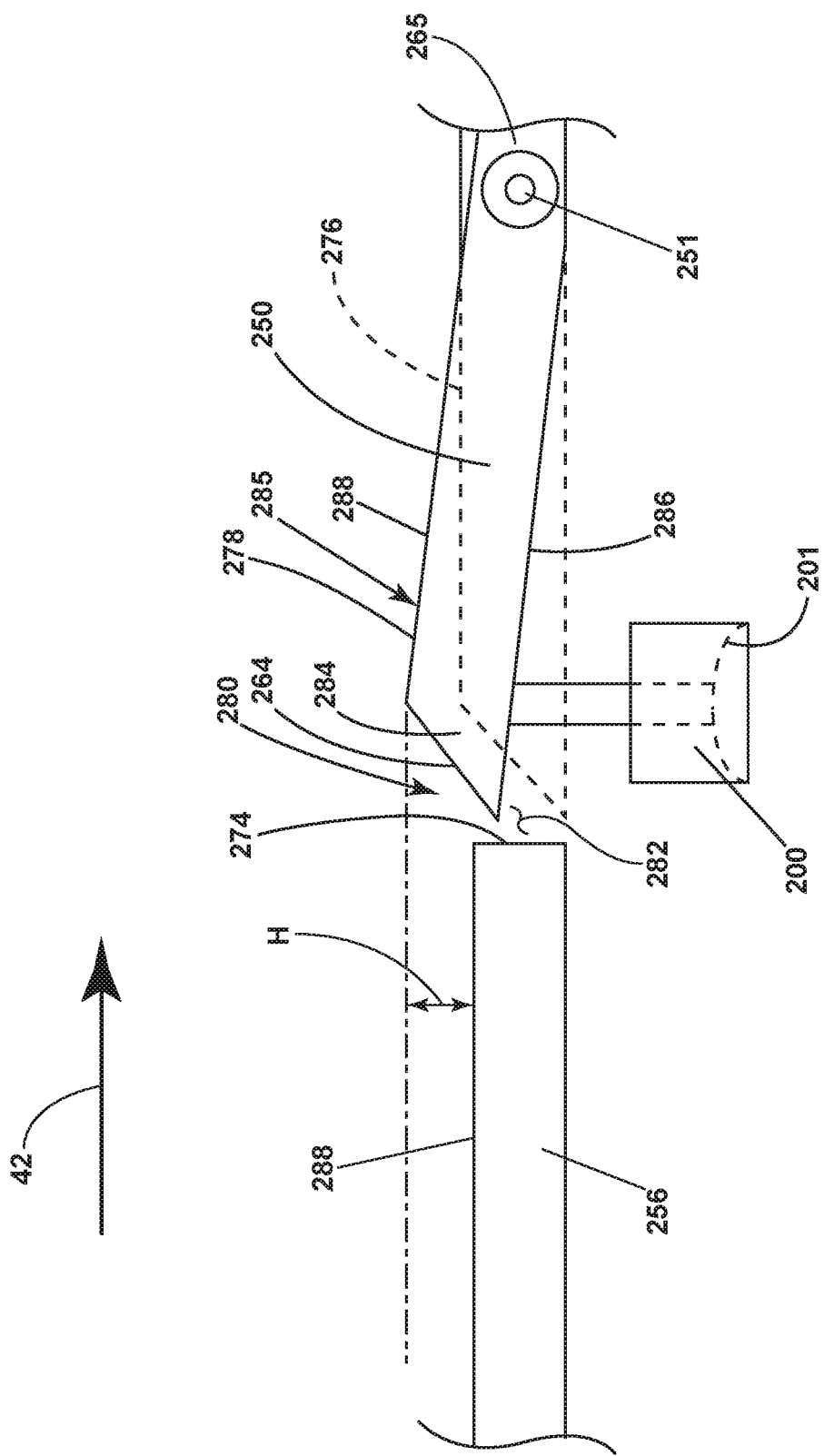
FIG. 6 is a third embodiment of a junction of the annular inlet cowl of FIG. 2.
Figure 7:
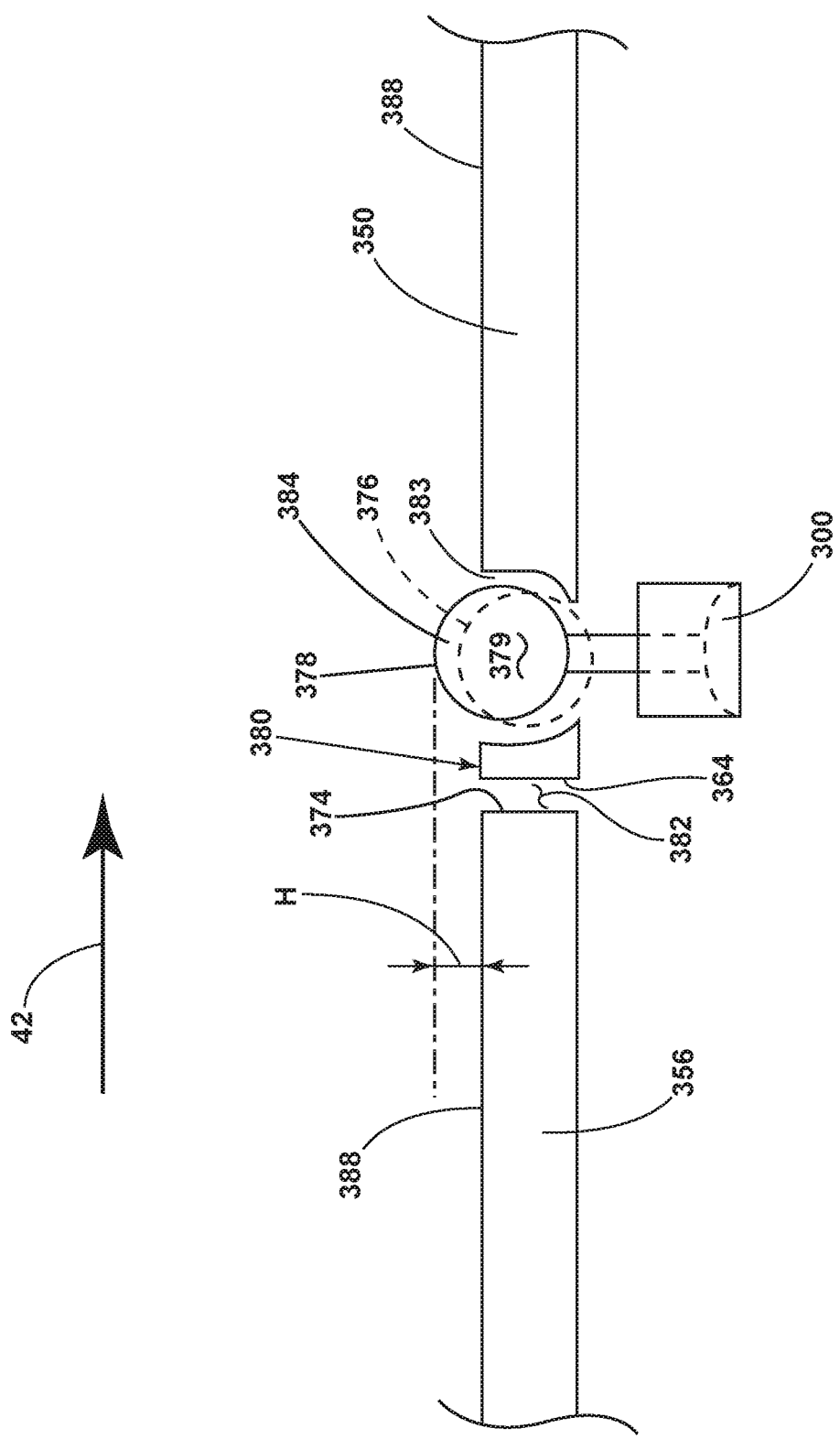
FIG. 7 is a fourth embodiment of a junction of the annular inlet cowl of FIG. 2.

Turning to FIGS. 5, 6, and 7 alternative embodiments of the protuberance are illustrated with like parts identified by like numerals increasing by 100, with it being understood that the description of the like parts of the various aspects described herein applies to the additional embodiments, unless otherwise noted.

An alternative embodiment of a protuberance 184 is depicted in FIG. 5, where the protuberance 184 is rounded with a longer axial face 198 than the chamfered protuberance 84 of FIG. 4.

A third embodiment illustrated in FIG. 6 is a protuberance 284 comprising a movable element 285 wherein the movable element 285 is coupled to a pivot mount 251 within the inner barrel 250 at an inner end 265. An upstream edge 264 of the movable element 285 can be one of a chamfered or rounded edge. In a first position 276, a surface 288 at the movable element 285 is flush with the surface 288 at an inlet lip 256. In a second position 278, the inner end 265 of the movable element remains stationary while the upstream edge 264 is provided at a maximum height H radially outward of the surface 288. The maximum height H can vary on several factors, including the size of the inlet and the expected operating conditions. As described herein, a maximum height H can be one to two times the displacement thickness $\delta^*$.

An actuator 200 is provided below the movable element 285 at the protuberance 284 in a position radially outward the inner barrel 250. The actuator 200 can be a thermal actuator, for example but not limited to a wax motor including a thermally reactive element 201 that will expand when heated. The thermal actuator is not meant to be limiting and it should be understood that any mechanical element known in the art can also be provided to actuate the moveable element.

Turning to FIG. 7, a fourth embodiment of a protuberance 384 comprising an annular strip 379 is illustrated. In a first position 376 the annular strip 379 is ensconced downstream of an upstream edge 364 of an inner barrel 350 in a channel 383 provided in the inner barrel 350. In a second position 378, the annular strip 379 is radially inward of the channel 383 at a maximum height H above a surface 388 of the inlet lip 356. The maximum height H can vary on several factors, including the size of the inlet and the expected operating conditions. As described herein, a maximum height H can be one to two times the displacement thickness $\delta^*$. A thermal or mechanical actuator 300 as described herein is provided below the annular strip 379 to move it from the first position 376 to the second position 378. The annular strip can be any material capable of expanding and contracting when moved the maximum height H and able to sustain large temperature differentials, by way of non-limiting example silicone.

Figure 8:
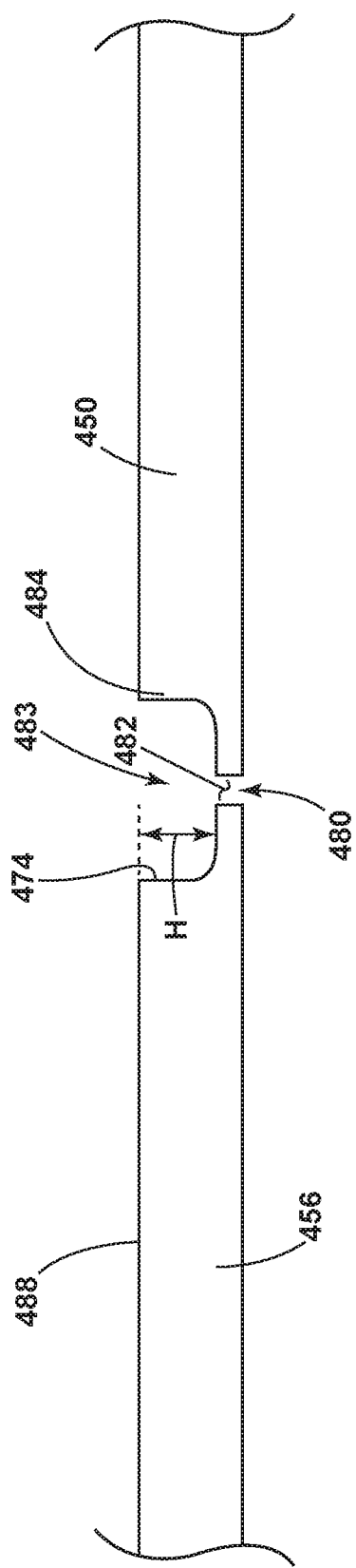
FIG. 8 is a fifth embodiment of a junction of the annular inlet cowl of FIG. 2.

FIG. 8 is a fifth embodiment in which a protuberance 484 is contemplated as downstream from a channel 483 formed at the junction 480. The channel has a depth of H, and as described herein, a maximum H can be one to two times the displacement thickness δ*. The channel 483 is provided in a surface 488 upstream of the protuberance 484. The channel 483 can be formed in the inner barrel 450 and the inlet lip 456 as illustrated. It can also be contemplated that the channel 483 is formed in one of the inner barrel 450 or the inlet lip 456.

The protuberance can be any shape including but not limited to sharp or rounded, ramped or fined, sphere or rectangular. The protuberance can comprise for example but not limited to a collection of deformations, walls, fins, or the like to define a surface roughness. The embodiments disclosed herein are exemplary and not meant to be limiting.

Figure 9A:
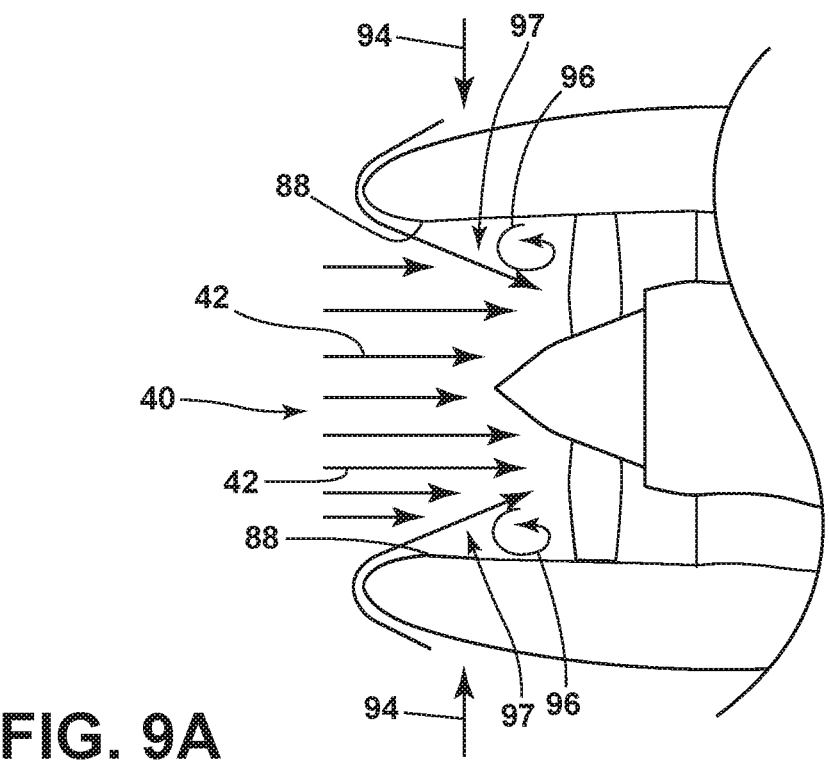
FIG. 9A is a schematic illustration of the annular inlet cowl with an airflow.

FIG. 9A is a schematic illustration of an annular inlet cowl without the protuberance 84 illustrating airflow separation that can occur along a surface 88.

Figure 9B:
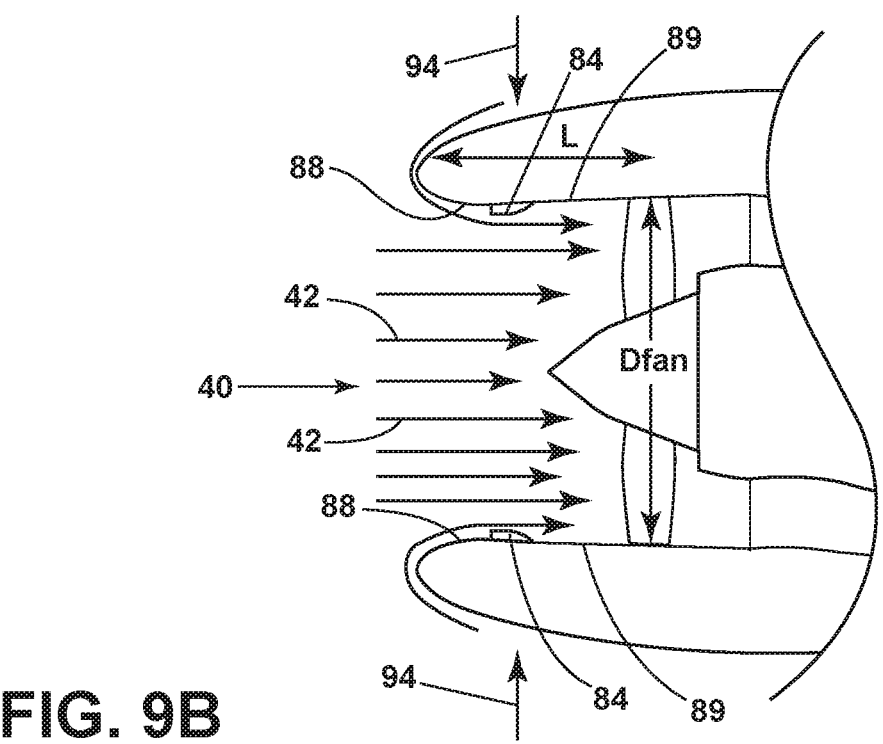
FIG. 9B is a schematic illustration of the annular inlet cowl with an airflow and including a protuberance.

FIG. 9B is a schematic illustration of the annular inlet cowl 38 described herein with a protuberance 84. A method for controlling airflow distortion 96 in the annular inlet cowl 38 includes reducing airflow separation 97 along an interior surface 89 of the inlet cowl 38 by flowing air over the protuberance 84 downstream of the inlet opening 40. The interior surface 89 is a region anywhere along the surface 88 in the interior of the inlet opening 40 up to the fan blades 28. The protuberance 84 is formed along the portion 92 of the turbine engine confronting the crosswind 94.

It is further contemplated that a fan diameter $D_{fan}$ and lip skin length L can be measured as illustrated in FIG. 9B to further define the maximum height H. For the protuberance 84 as described herein, a ratio of $H/D_{fan}$ between 0.0005 and 0.004 for a subsonic inlet with a $L/D_{fan}$ ratio between 0.2 and 0.5 is also contemplated.

In the case where the protuberance 284, 384 is a movable element 285, 385, the method can include actuating the protuberance 284, 384 upon receiving a signal by moving the protuberance 284, 384 from the first position 276, 376 to the second position 278, 378. The signal can be one of automation or pilot controlled.

In the case of an automatic signal, the actuator can be programmed to move the protuberance 284, 384 from the first position 276, 376 to the second position 278, 378 when the fan reaches a first speed and back to the first position 276, 376 when the fan reaches a second speed. The range from the first speed to the second speed can be between 50 and 100% N1K, a corrected speed nomenclature. Corrected speed is the speed a component would rotate at if the inlet temperature corresponded to ambient conditions at sea level on a standard day and can be abbreviated to N, in this case N1K, on the magnitude of 1000 rpm.

It is also contemplated that the actuator is a thermal actuator in which case the protuberance would be moved from the first 276, 376 to the second position 278, 378 and back to the first position 276, 376 under thermal conditions coinciding with fan speeds between 50 and 100% N1K.

Providing a protuberance in the surface of the inlet cowl reduces fluid separation near the fan blades. Tests performed using the method described herein produced an expansion between 10 and 20% N1K between part-speed separation and high-speed separation in the inlet cowl. The reduction in fluid separation significantly reduces the possibility of a compressor stall, increasing operational envelopes in which jet engines must operate.

Commercial benefits relate to strict crosswind operational envelopes required for commercial jet engines as well as aircraft maneuvers due to allowable limits on flow distortion. The protuberance 84 and method to control the flow separation characteristics of an inlet described herein provide larger flexibility in designing smaller and slimmer inlets with lower drag and lower weight and lower weight fan blades with better aero design. Lower weight allows for better overall performance and an introduction of the protuberance 84 enables less restrictive crosswind operational envelopes for the commercial airliners. A decrease in fluid separation leads to better durability for turbomachinery and flight inlet development for high bypass ratio turbofan engines.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An inlet cowl for a turbine engine comprising:
   an annular body defining an inlet opening and an outlet opening to define an inlet airflow flowing in a flow direction from the inlet opening to the outlet opening, the annular body comprising:
   an annular nose section at the inlet opening terminating in a downstream edge and defining a first portion of an inner surface of the inlet opening; and
   an inner barrel defining a second portion of the inner surface and having a cross-sectional profile extending between an outer surface of the inner barrel and the second portion of the inner surface to define a radial direction with a protuberance having a tip and an axial face extending from the tip to the second portion of the inner surface, the protuberance extending radially beyond the first portion of the inner surface of the inlet opening to define a height;
   wherein the annular nose section is spaced from the inner barrel to define a gap and the tip is located downstream of the gap with respect to the inlet airflow.

2. The inlet cowl of claim 1 further comprising an outer barrel radially spaced from the inner barrel.

3. The inlet cowl of claim 2 wherein the protuberance is formed only on the inner barrel.

4. The inlet cowl of claim 2 wherein the gap is formed between the downstream edge and an upstream edge of the inner barrel.

5. The inlet cowl of claim 1 wherein the protuberance faces the inlet opening.

6. The inlet cowl of claim 1 wherein the protuberance is chamfered or rounded.

7. The inlet cowl of claim 4 further comprising a movable element wherein the movable element selectively forms the protuberance.

8. The inlet cowl of claim 7 wherein the movable element is pivotally coupled within the inner barrel at an inner end downstream from the upstream edge of the inner barrel.

9. The inlet cowl of claim 8 wherein the movable element is chamfered or rounded.

10. The inlet cowl of claim 9 further comprising an actuator operably coupled to the movable element to move the movable element in order to adjust the height.

11. The inlet cowl of claim 10 wherein the actuator is at least one of a thermal or mechanical element.

12. The inlet cowl of claim 1 wherein the protuberance is disposed on a side of the inlet cowl confronting a crosswind.

13. The inlet cowl of claim 1 wherein the height is a function of a boundary layer thickness or a fan diameter.

14. A turbine engine comprising:
   an inlet and an exhaust, with a compressor section, a combustion section, and a turbine section in axial arrangement to define a flow path between the inlet and the exhaust;
   an annular inlet cowl having an inlet lip defining a first portion of an inner surface of the inlet and terminating in a downstream edge, an inner barrel defining a second portion of the inner surface of the inlet, and an outer barrel, the downstream edge confronting the inner barrel;
   a junction defining an intervening gap between the downstream edge of the inlet lip and an upstream edge of the inner barrel; and
   a protuberance having a tip located downstream of the intervening gap with respect to the flow path, the protuberance defining at least a portion of the upstream edge continuing from the second portion of the inner surface of the inlet, located in the inner barrel at the junction, confronting the flow path, and extending radially beyond the inner surface.

15. The turbine engine of claim 14 wherein the protuberance faces the inlet.

16. The turbine engine of claim 14 wherein the protuberance is chamfered or rounded.

17. The turbine engine of claim 14 further comprising a movable element wherein the movable element selectively forms the protuberance.

18. The turbine engine of claim 17 wherein the movable element is pivotally coupled within the inner barrel at a location downstream of the upstream edge of the inner barrel.

19. The turbine engine of claim 18 wherein the movable element is rounded or chamfered.

20. The turbine engine of claim 17 further comprising an actuator operably coupled to the movable element in order to adjust a height of the protuberance.

21. The turbine engine of claim 20 wherein the actuator is at least one of a thermal or mechanical element.

22. The turbine engine of claim 14 wherein the protuberance is disposed on a side of the turbine engine confronting a crosswind.

23. The turbine engine of claim 14 wherein the protuberance has a maximum height that is a function of a boundary layer thickness or a fan diameter.

24. A method of controlling airflow distortion the turbine engine according to claim 14, the method comprising:
   reducing airflow separation along the inner surface of the inlet by flowing air over the protuberance.

25. The method of claim 24 wherein the controlling airflow distortion further comprises actuating the protuberance.

26. The method of claim 25 wherein the actuating includes receiving a signal at an actuator and moving the protuberance from a first position to a second position.

27. The method of claim 26 wherein the protuberance is formed along a side of the turbine engine confronting a crosswind.

* * * * *